United States Patent
Carlsson et al.

(10) Patent No.: US 6,588,823 B1
(45) Date of Patent: Jul. 8, 2003

(54) VEHICLE SEAT UNIT

(75) Inventors: Anders Carlsson, Hisings Backa (SE); Lennart Simonsson, Vårgårda (SE)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 10/148,081

(22) PCT Filed: Nov. 23, 2000

(86) PCT No.: PCT/SE00/02304
§ 371 (c)(1), (2), (4) Date: Aug. 12, 2002

(87) PCT Pub. No.: WO01/38131
PCT Pub. Date: May 31, 2001

(30) Foreign Application Priority Data

Nov. 26, 1999 (GB) .............................................. 9928039

(51) Int. Cl.[7] .............................................. B60N 3/04
(52) U.S. Cl. .................... 296/65.01; 296/66; 296/65.13; 296/65.16
(58) Field of Search ............... 296/65.01, 66, 296/65.09, 65.16, 65.13; 297/15, 337

(56) References Cited

U.S. PATENT DOCUMENTS 3,202,453 A * 8/1965 Richards 5,269,581 A * 12/1993 Odagaki et al. .............. 296/66

FOREIGN PATENT DOCUMENTS

| EP | 0211248 A2 | 2/1987 |
|----|------------|--------|
| EP | 0769411 A2 | 4/1997 |
| EP | 0769412 A2 | 4/1997 |
| EP | 0780261 A2 | 6/1997 |
| EP | 0808744 A2 | 11/1997 |

* cited by examiner

Primary Examiner—Joseph D. Pape
(74) Attorney, Agent, or Firm—Venable LLP; Robert Kinberg; Chad Anderson

(57) ABSTRACT

A seat for a motor vehicle comprises a squab carried by a frame (31) and a back (54). The squab (31) is mounted for movement along a rail (21, 22, 23) from an operative position to a stored position remote from the operative position. The seat back (54) is pivotally mounted for movement from an operative position to a stored position. Part of the seat-back, when in the stored position, occupies space that was occupied by the squab of the seat when the squab of the seat was in the operative position. The seat may be mounted in a motor vehicle in such a way that part (55) of the back of the seat, when in the stored position, is substantially flush with part of the floor (53) of the motor vehicle to provide a load carrying platform.

3 Claims, 6 Drawing Sheets

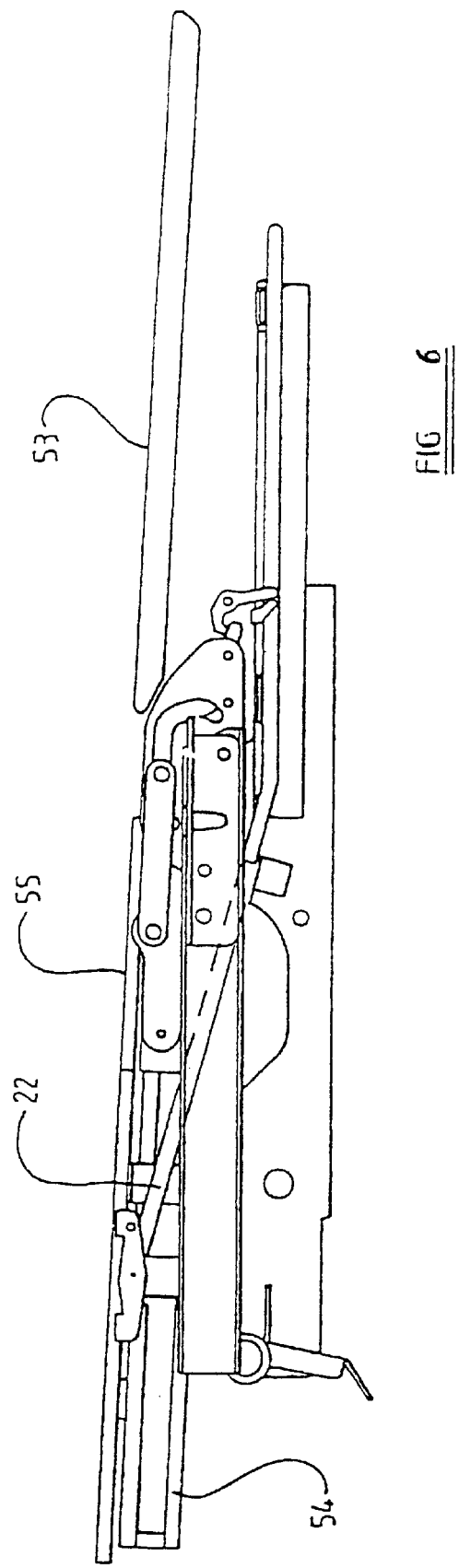

VEHICLE SEAT UNIT

BACKGROUND OF THE INVENTION

The present invention relates to a vehicle seat unit and more particularly relates to a vehicle seat unit adapted to be moved from an operative position to a stored position, the seat unit, in the stored position, presenting an upper surface substantially flush with the floor of the vehicle in which the seat is mounted, to provide a load-carrying platform of substantial area.

Seats of this type are often utilized in estate cars or cars of the "MPV" type.

There have been many prior proposed seat arrangements of the present type, but this invention seeks to provide an improved seat arrangement that is comfortable in use and which is easy to manufacture, and which is simple in design, whilst making optimum use of the available space.

SUMMARY OF THE INVENTION

According to this invention there is provided a seat for a motor vehicle, the seat comprising a squab and a back, the squab being mounted for movement along guide means from an operative position to a stored position remote from the operative position, the seat-back being pivotally mounted for movement from an operative position to a stored position, part of the seat-back when in the stored position, occupying space that was occupied by the squab of the seat when the squab of the seat was in the operative position, the seat being mountable in a motor vehicle in such a way that part of the back of the seat, when in the stored position, is substantially flush with part of the floor of the motor vehicle to provide a load-carrying platform, the squab of the seat being mounted for movement and wherein the squab of the seat, when in the stored position is located beneath part of the floor of the motor vehicle.

Conveniently a releasable catch is provided to retain the squab of the seat in the operative position.

Preferably a stay is provided to retain the back of the seat in the operative position and wherein a catch is provided adapted to move part of the stay to enable the back of the seat to be moved to the stored position, the catch being actuated by means carried by the squab of the seat when the squab of the seat is in or being moved towards its stored position.

In order that the invention may be more readily understood, and so that further features thereof may be appreciated, the invention will now be described, by way of example, with reference to the accompanying drawings in which:

BRIEF DESCRIPTION OF THE DRAWINGS

FIG. 6 is a view corresponding to FIG. 4 showing the seat in a stored position.

DETAILED DESCRIPTION OF THE PREFERRED EMBODIMENT

As will become clear from the following description, a seat in accordance with the invention comprises a squab and a back-rest. The squab is movable from a stored position, in which it lies underneath the floor of the vehicle at a position behind that occupied by the seat, to an operative position. The squab of the seat is mounted to effect this movement along guide means in the form of rails. The back-rest is mounted to effect pivotal movement between a stored or horizontal position and an elevated or operational position.

Figure 1:
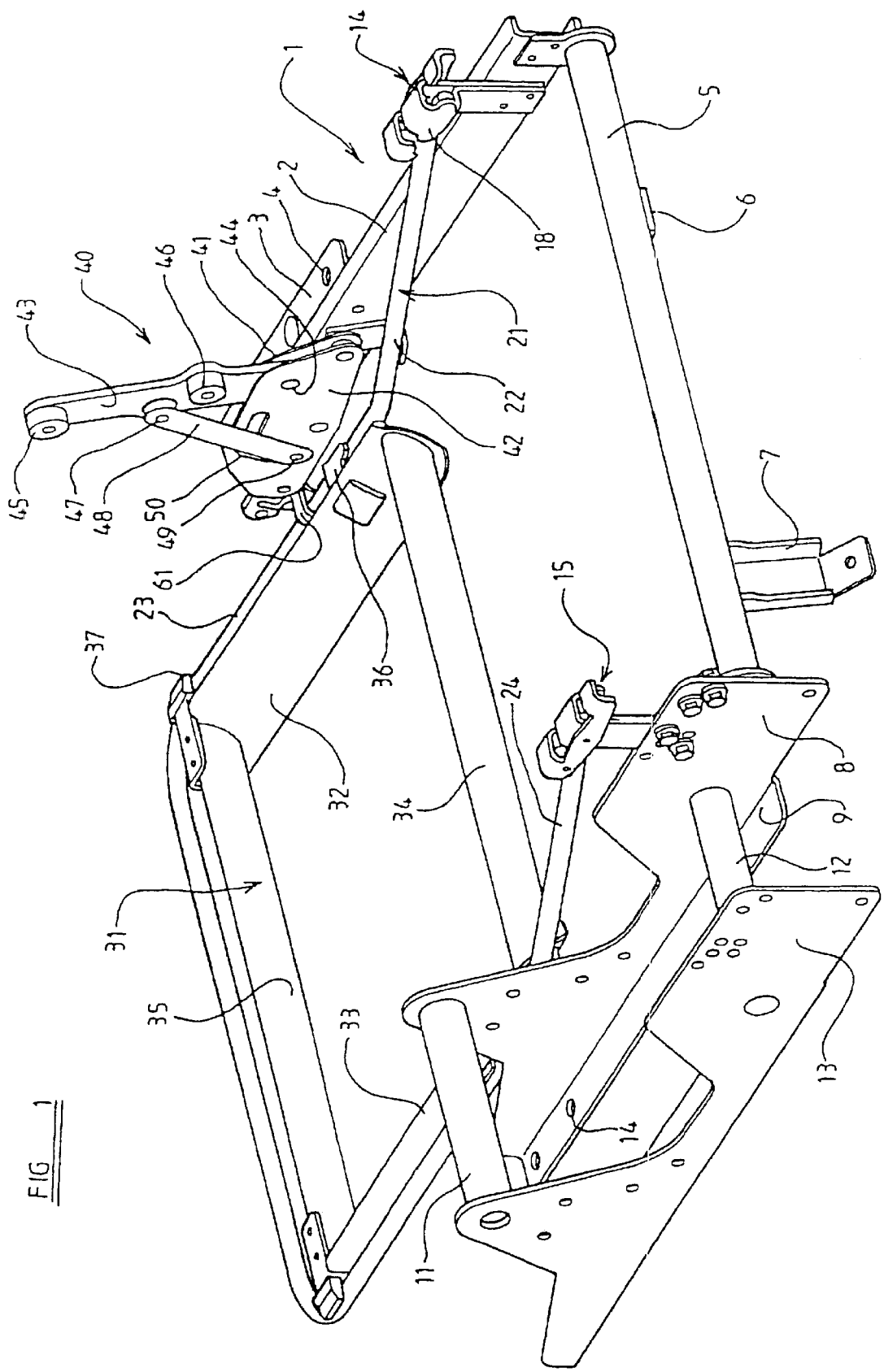
FIG. 1 is a perspective view of part of the structure of a seat in accordance with the invention.
Figure 2:
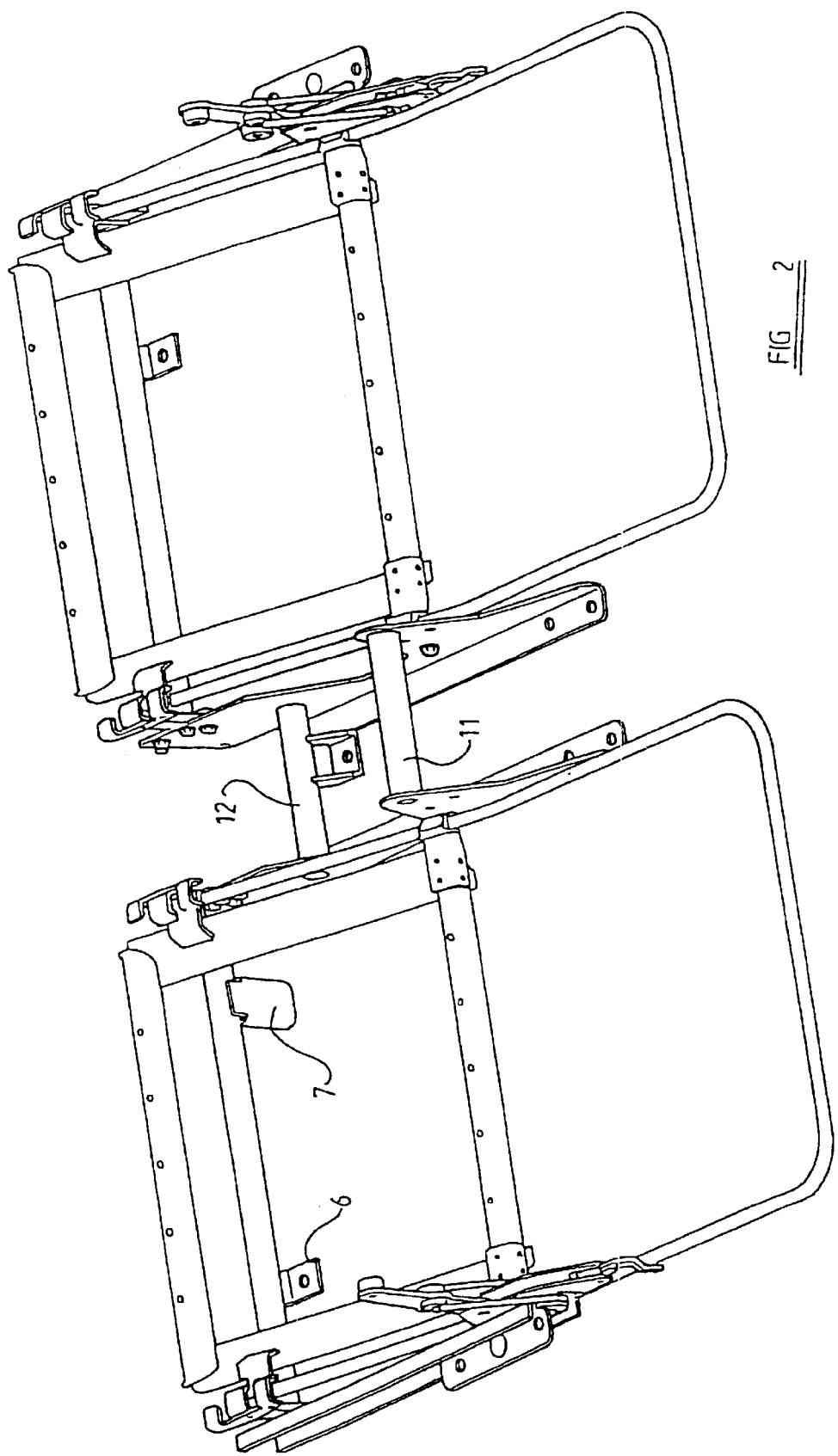
FIG. 2 is a view showing the sub-structure of two adjacent seats in accordance with the invention.

Referring initially to FIG. 1 of the accompanying drawings, part of the sub-structure of a seat in accordance with the invention is illustrated. A frame 1 is provided which is secured to the chassis of the vehicle. The frame 1 comprises a first elongate side element 2 having a horizontally outwardly extending flange 3 provided with an aperture 4 to receive a fastening bolt to secure the element 2 to the vehicle, with the side element 2 parallel with the elongate axis of the vehicle. The frame 1 incorporates a rod 5 extending transversely from the forward end of the side element 2, the rod being provided, at positions intermediate its ends, with a first mounting bracket 6 and a second mounting bracket 7 adapted to be connected to the vehicle. The rod 5 is connected to a further elongate side frame element 8 which is parallel with the first side element 2 and which has a horizontal flange 9 provided with apertures 10 adapted to receive bolts or the like, to connect the element 8 to the vehicle. The frame element 8 is connected by connecting bars 11, 12 to a corresponding mirror-image frame element 13 which, as can be appreciated from FIG. 2, forms part of an adjacent identical (but mirror-image) seat substructure.

The forward part of the side element 2 and the forward part of the side element 8, adjacent the transverse bar 5, each carry an upstanding assembly 14, 15. The upstanding assemblies 14, 15 are of mirror image configuration. Only the assembly 14 will be described in detail.

Figure 3:
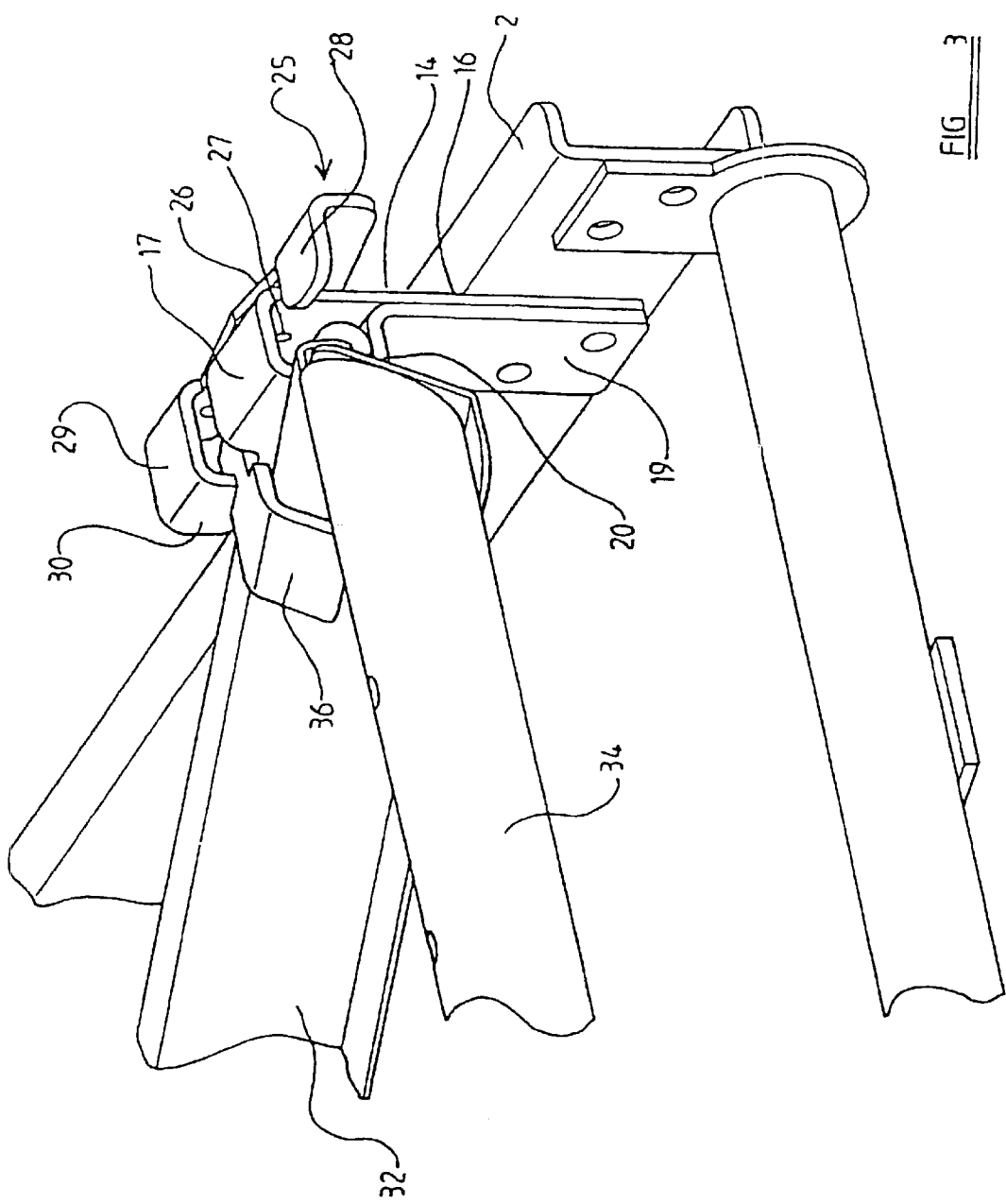
FIG. 3 is an enlarged perspective view of part of the sub-structure as shown in FIGS. 1 and 2.

The assembly 14, as shown more clearly in FIG. 3 comprises a first plate 16 connected to one surface of the frame element 2, that plate 16 extending vertically upwardly above the upper edge of the frame element 2, and then bending over to form a horizontally inwardly extending portion 17, extending in towards the center of the seat, which terminates with a depending portion 18, which can be seen most clearly in FIG. 1. A second vertical plate 19 is provided mounted on top of the lower part of the first plate 16, the second plate having an upper part 20 which is bent inwardly of the seat. Supported on the inwardly bent part 20, and received between the inwardly bent part 20 and the second plate 19, and the depending portion 18 of the first plate 16, is one end of a "U"-shaped rod 21 which, as will become clear hereinafter, forms guide means comprising a rail on which the squab of the seat is mounted.

The other end of the rod 21 engages the upstanding assembly 15 provided on the side member 8 in a corresponding manner.

The rod 21 presents a first inclined portion 22 extending downwardly from the upstanding assembly 14, which merges with a substantially "U"-shaped horizontal portion 23, which, in turn, terminates with an inclined portion 24 extending to the upstanding assembly 15.

Mounted on each of the upstanding assemblies 14, 15 is a pivotally mounted "see-saw" catch, such as the catch 25 shown most clearly in FIG. 3. The catch 25 comprises a plate 26 which is pivotally connected 27 to part of the first plate 16 extending above the upper edge of the frame element 2. The plate 16 carries, at its forward end, a horizontal tab 28 which is adapted to be manually activated to operate the catch. At the rearward end of the plate 26 there is an inwardly directed region 29 carrying a depending tab 30.

Mounted on the rail constituted by the bar 21 is a frame 31 which supports the squab of the seat the frame 31 comprises two side elements 32, 33, inter-connected by a front transverse element 34 and a rear transverse element 35. Each side element 32, 33 is provided with a front runner 36 which engages the bar in a sliding manner, and a rear runner 37 which also engages the bar in a sliding manner. Thus the frame 31 may move from a rear-most position, as illustrated in FIG. 1, in which the frame is located beneath the floor of the vehicle in which the seat is mounted, the frame being at a position to the rear of the seat, and a more forward position. As the Frame 31 moves to the more forward position, the front runner 36 on the side arm 32, and the front runner 36 on the side arm 33 engage the respective see-saw catch 25. The arrangement is such that the see-saw catch will pivot and then return to an initial horizontal position as shown in FIG. 3. It can be seen that the tab 30 is located adjacent part of the front runner 36 on the side arm 32 of the frame 131, thus preventing the frame from sliding back down the inclined portions 22, 24 of the bar 21.

It is thus to be appreciated that the frame 31 carrying the squab of the seat can move from the initial stored position, as shown in FIG. 1, in which the squab of the seat is concealed beneath the floor of the vehicle, to an operative position in which the squab of the seat is accessible and is inclined, the squab being retained in the position by the catch 26 which can, when desired, be released by pressing the horizontal tab 28.

A seat back is provided which is connected to the sub-frame 1 mounted to the chassis of the vehicle by means of a hinge unit 40. One hinge unit is shown in FIG. 1 mounted to the side element 2, but a corresponding hinge unit may be provided mounted to the side element 8.

The hinge unit comprises two spaced apart vertical plates 41, 42. A connecting arm 43 of elongate configuration is provided the lower end of which is located between the plates 41, 42 and mounted for pivotal movement about a pivot axis 44. The connecting arm 43 is provided with connections 45, 46 to be connected to a frame forming part of a seat back. The connecting arm 43 is pivotally connected 47, to an elongate stay 48, the pivotal connection 47 being located between the two connectors 45 and 46. The stay 48 extends generally downwardly, and the lower end of the stay 48 is provided with a stud 49 received in a slot of complex form 50 provided in the plate 42. A corresponding stay 51, shown more clearly in FIG. 4, is provided on the other side of the connecting plate 43, that stay engaging a corresponding slot 52 provided in the plate 41.

Figure 4:
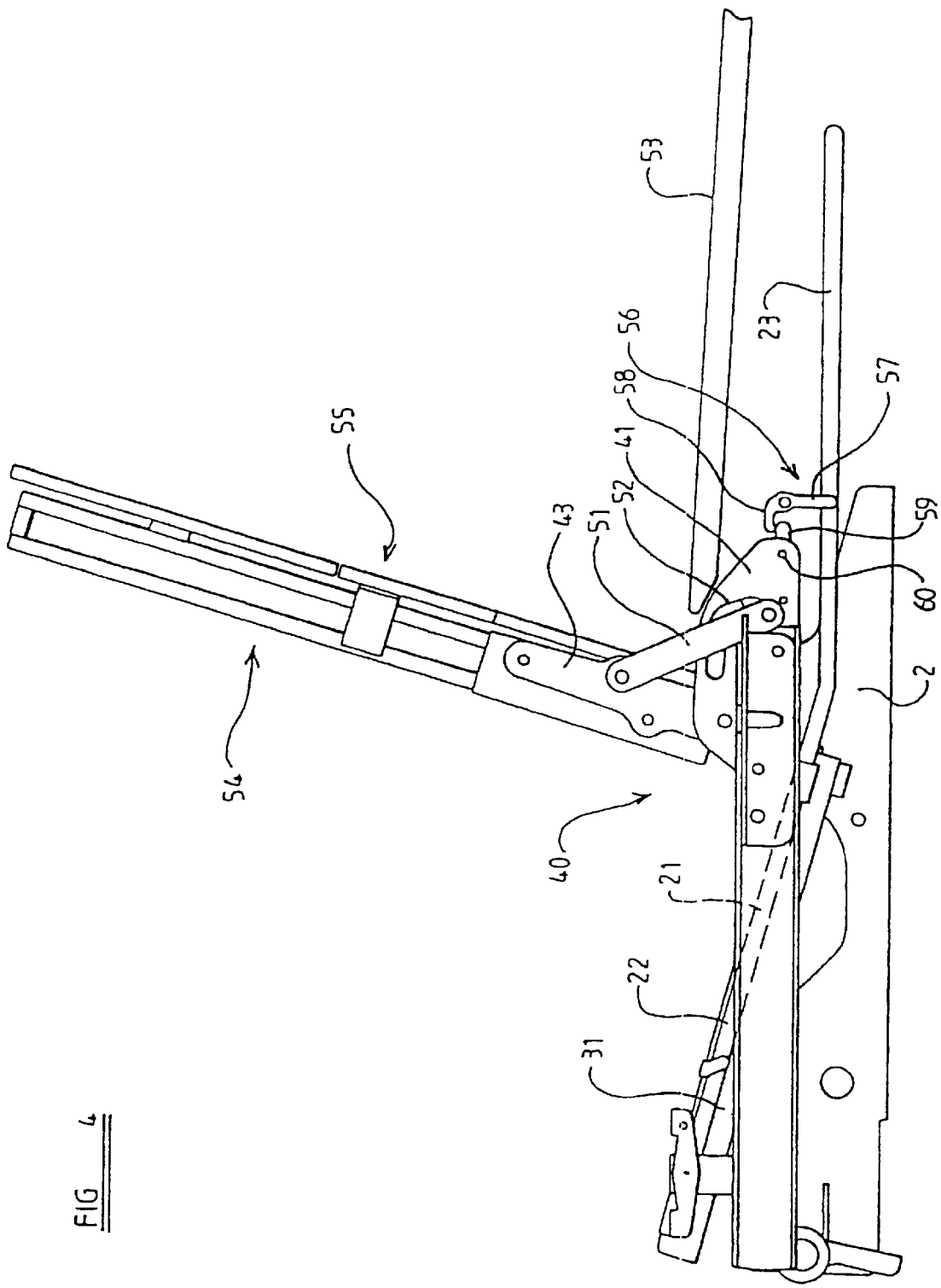
FIG. 4 is a diagrammatic side view illustrating a seat in accordance with the invention in the operative position.

Referring now to FIG. 4 of the accompanying drawings, the components described above are shown mounted in position within a motor vehicle. The frame 1 is secured to the floor of the vehicle, or sub-structure of the vehicle, and the bar 21 presents the forward inclined region 22 and the horizontal "U"-shaped region 23. The "U"-shaped region 23 is located beneath part of the load-carrying-floor 53 of the vehicle at a position behind the seat. In FIG. 4 the sub-frame 31 carrying the squab of the seat is shown in its operative position but, for the sake of clarity of illustration, the cushioning of the squab of the seat is not shown.

The support arm 43 of the hinge unit 40 is connected to a support frame 54 forming the back-rest of the seat. Again the relevant cushioning is not shown for the sake of clarity of illustration. It is to be appreciated that the width of the frame 54 is less than the spacing between the inclined portions 22, 24 of the bar 21. It is also to be appreciated that the frame 54 carries, on its rear surface, panelling 55 that can, in one position of the seat, constitute load-bearing flooring of the vehicle.

As can be seen more clearly in FIG. 4, a pivoting catch 56 is provided having a depending arm 57 lying adjacent the "U"-shaped region 23 of the bar 21. The catch has an operative finger 58 engaging a lug, 59 on a pivotally mounted member 60. The member 60 is adapted to retain the lower ends of each of the stays 51 and 48 within their respective slots 50, 52, but, when moved pivotally, the member 60 releases the lower ends of the stays so that the lower ends of the stays may move along the slots.

Figure 5:
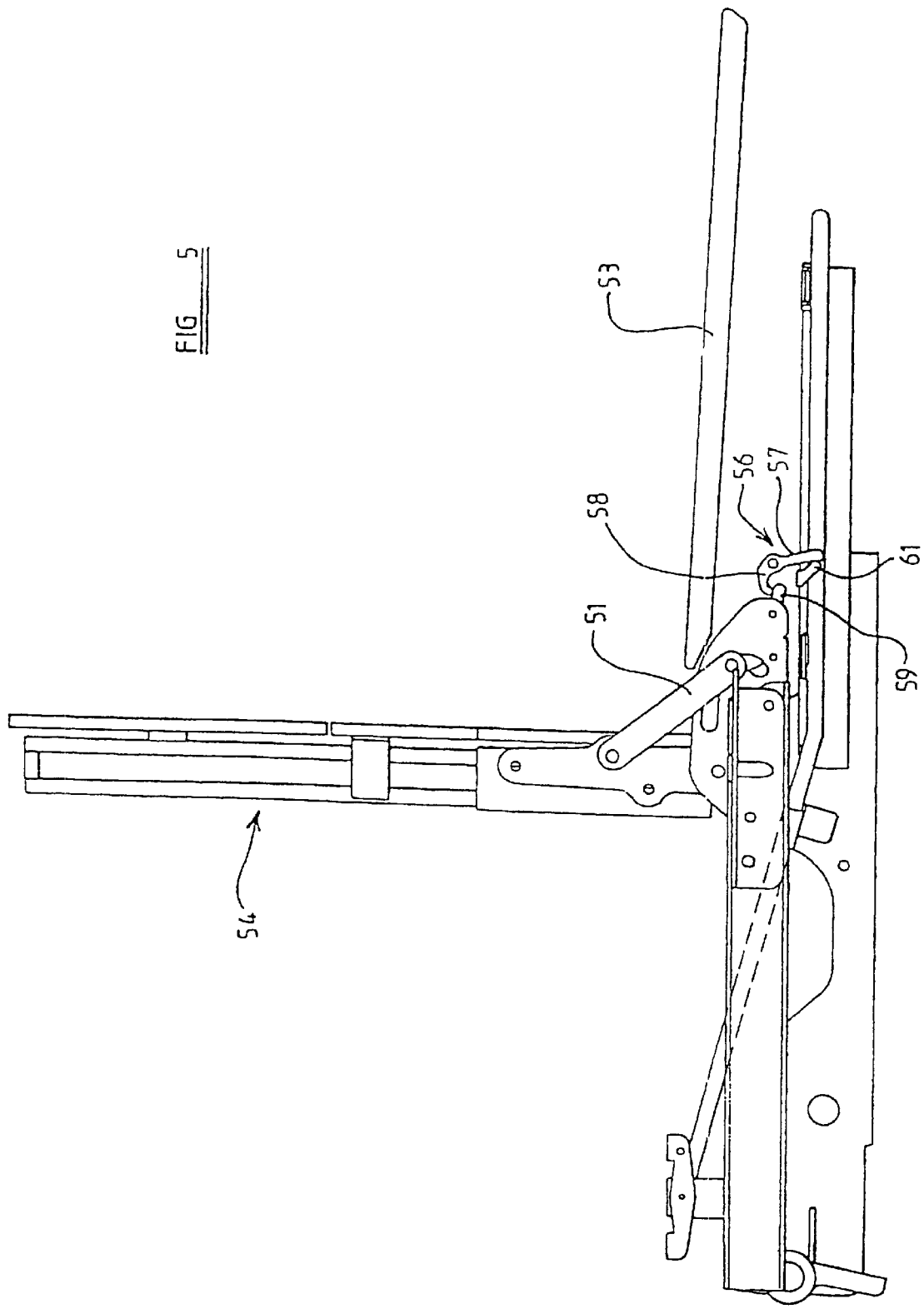
FIG. 5 is a side view illustrating the seat of FIG. 4 in an intermediate position.

Turning now to FIG. 5 of the accompanying drawings, when the seat is to be moved from the operative position to the stowed position, initially the see-saw catches 14 are released enabling the frame 31 carrying the squab of the seat to be slid down the inclined portions 22, 24 of the bar 21 to a position beneath the floor 53 of the vehicle. As the frame of the seat moves in this way, an actuating finger 61, carried by the frame 31 of the squab of the seat, engages the depending arm 57 of the catch 56, causing the operative finger 58 of the catch 56 to depress the lug 59 of the pivotally mounted member 60, thus releasing the lower end of the stays 48, 51 so that the lower ends move upwardly out of a lower arcuate end portion of the respective slots 50, 52. The frame 54 of the back of the seat thus moves to a vertical position, with the assistance of an appropriate spring (not shown) if required. The frame 54 of the back of the seat may then manually be moved further forwardly from the position shown in FIG. 5 to a fully forward position as shown in FIG. 6. It can be seen that when the frame 54 has been moved to the fully forward position, a substantial part of the frame 54 is received between the inclined portions 22, 24 of the bar 21. It can also be seen that the panelling 55 provided on the rear surface of the frame 54 is flush with the rest of the floor 53 of the vehicle, thus providing a relatively large load-carrying platform.

Thus, in the described embodiment of the invention, because the squab of the seat can move from its initial operative position to a retracted or stowed position, the frame-work constituting the back of the seat, and the associated padding, may then move to occupy the position that was previously occupied by the squab of the seat as the seat is moved to its stored position.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A seat for a motor vehicle, the seat comprising a squab and a back, the squab being mounted for movement along guide means from an operative position to a stored position remote from the operative position, the seat-back being pivotally mounted for movement from an operative position to a stored position, part of the seat-back when in the stored position, occupying space that was occupied by the squab of the seat when the squab of the seat was in the operative position, the seat being mountable in a motor vehicle in such a way that part of the back of the seat, when in the stored position, is substantially flush with part of the floor of the motor vehicle to provide a load-carrying platform, and wherein the squab of the seat, when in the stored position, is located beneath part of the floor of the motor vehicle.

2. A seat according to claim 1 wherein a releasable catch is provided to retain the squab of the seat in the operative position.

3. A seat according to any one of claims 1 to 2 wherein a stay is provided to retain the back of the seat in the operative position and wherein a catch is provided adapted to move part of the stay to enable the back of the seat to be moved to the stored position, the catch being actuated by means carried by the squab of the seat when the squab of the seat is in or being moved towards its stored position.

* * * * *

UNITED STATES PATENT AND TRADEMARK OFFICE
CERTIFICATE OF CORRECTION

PATENT NO. : 6,588,823 B1
DATED : July 8, 2003
INVENTOR(S) : Anders Carlsson et al.

It is certified that error appears in the above-identified patent and that said Letters Patent is hereby corrected as shown below:

<u>Title page,</u>
Item [73], Assignee, add -- Volvo Car Corporation, Göteborg, Sweden --.

Signed and Sealed this

Thirtieth Day of March, 2004

JON W. DUDAS
*Acting Director of the United States Patent and Trademark Office*